(12) United States Patent
Helgertz et al.

(10) Patent No.: US 11,616,913 B2
(45) Date of Patent: Mar. 28, 2023

(54) SYSTEM AND METHOD FOR IMAGE CONTENT RECORDING OF A MOVING USER

(71) Applicant: SONY GROUP CORPORATION, Tokyo (JP)

(72) Inventors: Johan Helgertz, Lund (SE); Kristian Dreher, Kävlinge (SE); Mathias Franzén, Lund (SE); Jonas Berglund, Lund (SE); Fredrik Persson, Lund (SE); Mikael Berglund, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/353,304

(22) Filed: Jun. 21, 2021

(65) Prior Publication Data

US 2021/0400205 A1 Dec. 23, 2021

(30) Foreign Application Priority Data

Jun. 22, 2020 (SE) .................................. 2050738-0

(51) Int. Cl.
*H04N 5/232* (2006.01)
*B64C 39/02* (2006.01)

(52) U.S. Cl.
CPC ..... *H04N 5/232933* (2018.08); *B64C 39/024* (2013.01); *H04N 5/23299* (2018.08); *B64C 2201/127* (2013.01)

(58) Field of Classification Search
CPC .............. H04N 5/2253; H04N 5/2257; H04N 5/23299; H04N 5/232933; B64C 39/024; B64C 2201/146; B64C 2201/024; B64C 2201/027; B64C 2201/127; G05D 1/0016; G05D 1/0094

USPC ..................................................... 348/207.99
See application file for complete search history.

(56) References Cited

U.S. PATENT DOCUMENTS

| 9,769,387 | B1 | 9/2017 | Beard | |
| 9,798,322 | B2 | 10/2017 | Bachrach | |
| 10,466,695 | B2 * | 11/2019 | Bachrach | ............. B64C 39/024 |
| 10,520,943 | B2 * | 12/2019 | Martirosyan | .......... B64D 47/08 |

(Continued)

FOREIGN PATENT DOCUMENTS

| CN | 107197165 A | 9/2017 |
| WO | 2016015251 A1 | 2/2016 |

(Continued)

OTHER PUBLICATIONS

Swedish Search Report from corresponding Swedish Application No. 2050738-0, dated Mar. 18, 2021, 4 pages.

(Continued)

*Primary Examiner* — Pritham D Prabhakher
(74) *Attorney, Agent, or Firm* — Tucker Ellis LLP

(57) ABSTRACT

A system for recording image content of a moving user. The system includes a control system, a drone carrying an imaging device, and a user interface for communication with the control system. The control system is configured to: obtain identification data of a user via the user interface; capture an identification image of a predetermined starting area; output said identification image for display on the user interface; obtain identification confirmation of the image; and control the drone, responsive to the obtained confirmation, to monitor movement of the user using the imaging device.

19 Claims, 5 Drawing Sheets

(56) References Cited

U.S. PATENT DOCUMENTS

| | | | |
|---|---|---|---|
| 10,768,639 B1* | 9/2020 | Meisenholder | G05D 1/0016 |
| 10,802,491 B2* | 10/2020 | Feng | B64C 39/024 |
| 11,016,487 B1* | 5/2021 | Roberts | G08B 13/19606 |
| 11,263,461 B2* | 3/2022 | Marty | G05D 1/0094 |
| 2016/0054737 A1 | 2/2016 | Soll et al. | |
| 2017/0064181 A1 | 3/2017 | Zhang | |
| 2018/0046187 A1 | 2/2018 | Martirosyan et al. | |
| 2018/0067482 A1 | 3/2018 | Lema | |
| 2018/0095459 A1* | 4/2018 | Bachrach | H04N 5/23206 |
| 2018/0237137 A1 | 8/2018 | Tovey | |
| 2018/0365839 A1 | 12/2018 | Feng et al. | |
| 2019/0011922 A1 | 1/2019 | Feng | |
| 2019/0135450 A1 | 5/2019 | Zhou | |
| 2019/0289193 A1 | 9/2019 | Bevirt | |
| 2020/0241575 A1* | 7/2020 | Meisenholder | G05D 1/12 |
| 2021/0261247 A1* | 8/2021 | Rajan Kesavelu Shekar | B64C 39/024 |
| 2021/0373557 A1* | 12/2021 | Tazume | B64D 45/00 |

FOREIGN PATENT DOCUMENTS

| | | | |
|---|---|---|---|
| WO | 2016154944 A1 | 10/2016 | |
| WO | 2018058307 A1 | 4/2018 | |
| WO | 2019198868 A1 | 10/2019 | |

OTHER PUBLICATIONS

European Search Report from corresponding European Application No. 21173423.1, dated Jul. 22, 2021, 7 pages.

* cited by examiner

SYSTEM AND METHOD FOR IMAGE CONTENT RECORDING OF A MOVING USER

RELATED APPLICATION DATA

This application claims the benefit of Swedish Patent Application No. SE 2050738-0, filed Jun. 22, 2020, the disclosure of which is incorporated herein by reference in its entirety.

TECHNICAL FIELD

Solutions are provided herein within the field of image recording from an unmanned vehicle. Specifically, the proposed solutions relate to image recording of a user, and control of the unmanned vehicle for this purpose.

BACKGROUND

Unmanned vehicles, also referred to herein as drones, are increasingly being used as platforms for taking images and video. Such drones may be configured to move and operate from land or at sea, whereas a more common configuration is to employ flying drones. Such drones are commonly referred to as Unmanned Aerial Vehicles (UAV).

A number of UAV systems are currently available that provide for image and video capture and remote control from a device on the ground. However, currently available systems require piloting using direct control of the UAV, e.g. by directly adjusting the pitch, roll, yaw, and power by for example using common control inputs such as joysticks and throttle controls. While effective to a degree, such control systems require certain skill and operation of the pilot. Instead of pilot-controlled drones, methods have been developed for indirect or automatic drone control.

US2018095459 discloses methods for user interaction with UAV using a portable multifunction device (PMD) such as smart phone. A user may control image capture from the UAV by adjusting the position and orientation of a PMD. This way, by moving the PMD, maneuvering of the UAV is carried out while capturing images directed to the position of the PMD. This way, control of the UAV is simplified such that image capturing of the user may still be obtained. Still, the presence and operation by the pilot is required. This provides a solution which is complex and requires user attention.

There is consequently still a need for improvement in facilitation of image capturing from a drone.

SUMMARY

Based on the stated object, a solution is provided herein as generally set out in the independent claims. Various embodiments are presented in the dependent claims and in the following detail description.

According to one aspect, a system is provided for recording image content of a moving user, the system comprising a control system, a drone carrying an imaging device, and a user interface for communication with the control system. The control system is configured to:
  obtain identification data of a user via the user interface;
  capture an identification image of a predetermined starting area;
  output said identification image for display on the user interface;
  obtain identification confirmation of the image; and
  control the drone, responsive to the obtained confirmation, to monitor movement of the user using the imaging device.

The system provides a solution for image capturing from a drone with low complexity and an increased level of automation. This includes a convenient solution for identifying a user to which captured image content shall be shared.

DETAILED DESCRIPTION

Figure 1:
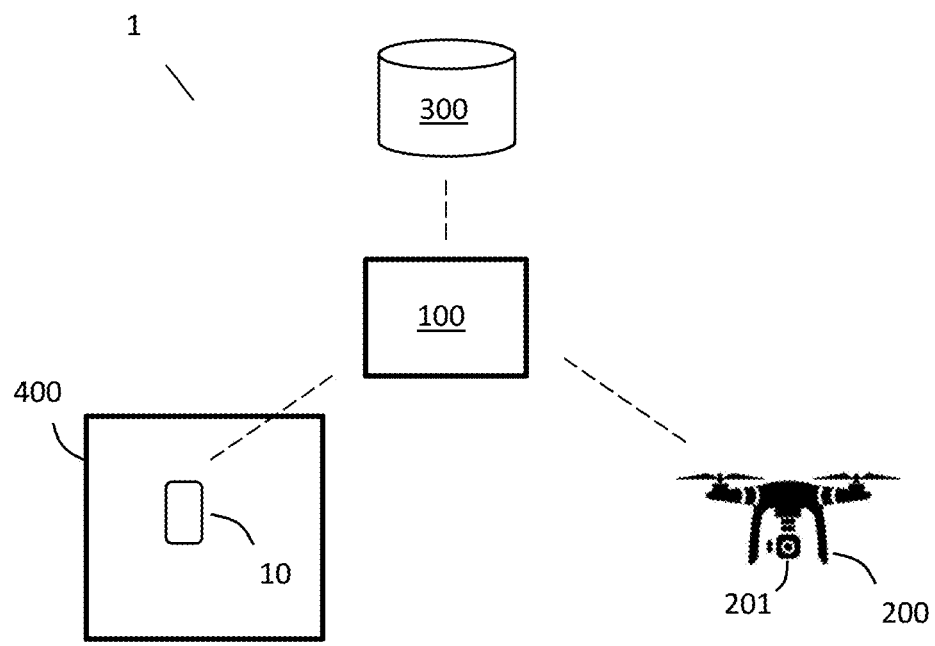
FIG. 1 schematically illustrates a system for recording image content of a moving user according to various embodiments, showing various entities that may form part of the system or having an operative connection to the system.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing various process solutions, an example of the scene of the system will be described, and various parts of the system will be functionally discussed.

FIG. 1 illustrates, by way of example, a system 1 for recording image content of a moving user. The system comprises a control system 100, configured to control a process of recording image content. The control system 100 may comprise a computer system, including hardware and software for execute various process steps. The control system 100 will mainly be described herein as one entity for the sake of simplicity. However, it shall be noted that the control system 100 may be distributed and include several physical entities as well as cloud services.

The system 1 further comprises a drone 200 carrying an imaging device 201. The drone is an unmanned vehicle. Specific examples are provided herein with regard to the drone being an UAV, but alternative solutions falling within the scope of the claims may include or other types of drones, configured to travel on the ground or in a fluid.

The system 1 further comprises a user interface 400 for communication with the control system 100. In some embodiments, the user interface 400 includes a display of a user device 10, which is associated to a particular user. The user device 10 may e.g. be a portable or wearable wireless communication device 10, such as a mobile phone, a wristband, a portable computer or tablet or other. In some embodiments, the user interface 400 may additionally, or alternatively, comprise a display located at a facility of the system 1, such as a screen on which control data may be displayed and configured with a user input mechanism.

The system 1 may be communicatively connectable to a server or application 300, for providing captured image content for subsequent user access.

While communication between various entities of the system may be wired, communication between at least the control system 100 and the drone 200, and between the user interface 400 and the control system 100, may be carried out wirelessly. In various embodiments, wireless communication may be carried out by means of wide area network (WAN), such as a cellular network. In some embodiments, wireless communication may be carried out by means of a local area network (LAN) connection, such as wi-fi or other related communication protocol, or a personal area network (PAN) such as Bluetooth, Zigbee or similar, or by near field communication provided by e.g. RFID. Different communication technologies may be used between different entities of the system 1. Details of the wireless communication are not fundamental to the proposed solutions and will not be described in detail herein.

Figure 2:
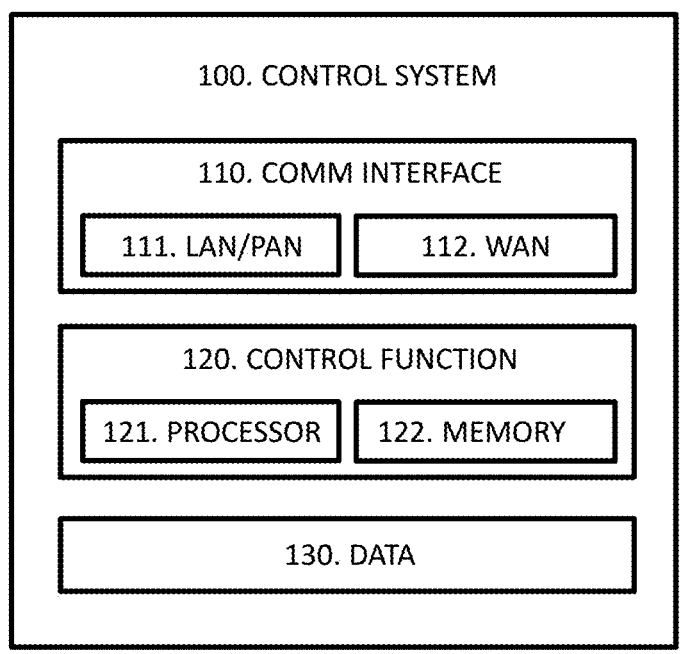
FIG. 2 schematically illustrates a control system for use in the system for recording image content of a moving user according to various embodiments.

FIG. 2 schematically illustrates an embodiment of the control system 100 for use in the system 1 and for carrying out the method steps as outlined herein. The control system 100 comprises a communication interface 110 for communicating with other entities of the system 1. In some embodiments, the communication interface 110 comprises a radio transceiver for wireless communication and may be configured to communicate using a LAN or PAN interface 111, and/or a WAN interface 112. The communication interface 110 may thus include a radio receiver and transmitter for communicating through at least an air interface.

The control system 100 further comprises logic acting as a control function 120, configured to communicate data, via the communication interface 110, with other entities of the system 1.

The logic of the control function 120 may include a processing device 121, including one or multiple processors, microprocessors, data processors, co-processors, and/or some other type of component that interprets and/or executes instructions and/or data. Processing device 121 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic of the control function 120 may further include memory storage 122, which may include one or multiple memories and/or one or multiple other types of storage mediums. For example, memory storage 122 may include a random access memory (RAM), a dynamic random access memory (DRAM), a cache, a read only memory (ROM), a programmable read only memory (PROM), flash memory, and/or some other type of memory. Memory storage 122 may include a hard disk (e.g., a magnetic disk, an optical disk, a magneto-optic disk, a solid state disk, etc.).

The memory storage 122 is configured for holding computer program code, which may be executed by the processing device 121, wherein the logic of the control function 120 is configured to control the control system 100 to carry out any of the method steps as provided herein. Software defined by said computer program code may include an application or a program that provides a function and/or a process. The software may include device firmware, an operating system (OS), or a variety of applications that may execute in the logic of the control function 120.

The control system 100 may further comprise a data memory for storing image content, as received from the imaging device 201 of the drone 200. The logic of the control function 120 may further be configured to process the image content, and transmit the image content, processed or not, to an outside recipient device such as the server 300 or directly to the UE 10.

Obviously, the control system 100 terminal may comprise other features and elements than those shown in the drawing or described herein, such as a power supply, a casing, a user interface, one or more sensors, etc., but such are left out for the sake of simplicity.

Figure 3:
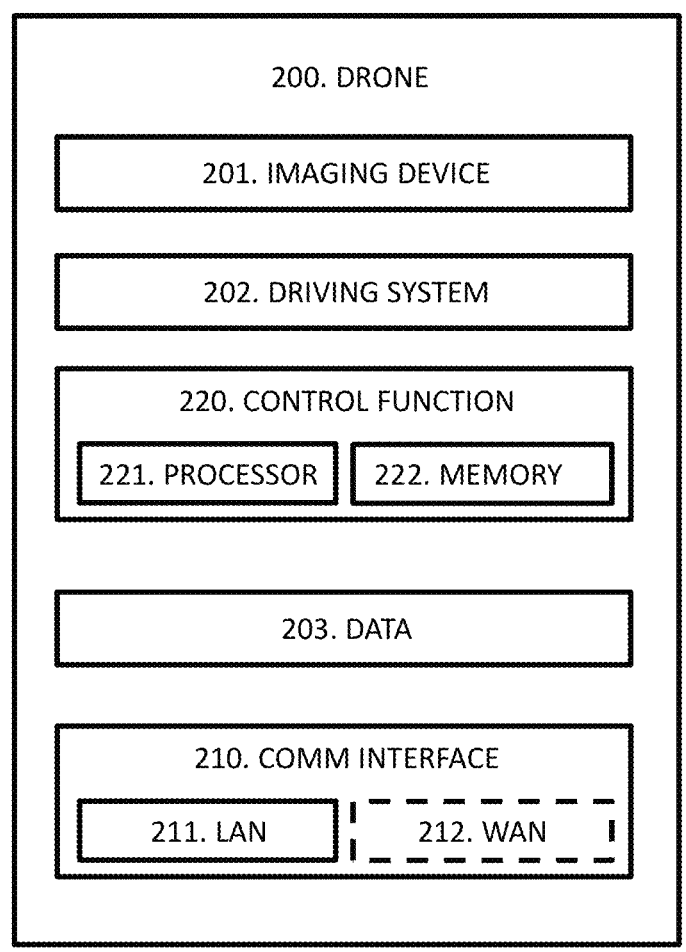
FIG. 3 schematically illustrates a drone for use in the system for recording image content of a moving user according to various embodiments.

FIG. 3 schematically illustrates functional elements of the drone 200 for use in the system 1 as outlined herein. The drone comprises an imaging device 201, such as a camera for taking still images or video images. The imaging device 201 may in turn comprise a lens system and a detector surface. Details of the imaging device are not crucial to the solutions proposed herein, and the imaging device 201 will thus not be described in any further detail.

The drone 200 further comprises a driving system 201, configured to propel and steer the drone responsive to control signals. The driving system comprises a motor and a steering system. For a drone 200 configured as a UAV the driving system 201 may comprise one or more rotors or other means for propelling the drone 200, and the steering system may include one or more rudders to maneuver the drone. For a drone configured as a land-moving vehicle the driving system 201 may comprise one or more wheels or similar. For a drone configured as a water-moving vehicle the driving system 201 may comprise a propeller or jet motor and a rudder.

The drone 200 further comprises a communication interface 210 for communicating with other entities of the system 1, such as the control system 100. In some embodiments, the communication interface 210 comprises a radio transceiver for wireless communication and may be configured to communicate using a LAN or PAN interface 211, and/or a WAN interface 212. The communication interface 210 may thus include a radio receiver and transmitter for communicating through at least an air interface.

The drone 200 further comprises logic acting as a control function 220, configured to control movement of the drone 200 by means of the driving system 202. The control function 220 is further configured to communicate data, such as image content data as captured by the imaging device 201, via the communication interface 210 with other entities of the system 1.

The logic of the control function 220 may include a processing device 221, including one or multiple processors, microprocessors, data processors, co-processors, and/or some other type of component that interprets and/or executes instructions and/or data. Processing device 121 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic of the control function 220 may further include memory storage 222, which may include one or multiple memories and/or one or multiple other types of storage mediums. For example, memory storage 122 may include a random access memory (RAM), a dynamic random access memory (DRAM), a cache, a read only memory (ROM), a programmable read only memory (PROM), flash memory, and/or some other type of memory. Memory storage 222 may include a hard disk (e.g., a magnetic disk, an optical disk, a magneto-optic disk, a solid state disk, etc.). The memory storage 222 is configured for holding computer program code, which may be executed by the processing device 221, wherein the logic of the control function 220 is configured to control the drone 200 to carry out any of the method steps as provided herein. Software defined by said computer program code may include an application or a program that provides a function and/or a process. The software may include device firmware, an operating system (OS), or a variety of applications that may execute in the logic of the control function 220.

The drone 200 may further comprise a data memory 203 for storing image content as obtained by the imaging device 201. The logic of the control function 220 may further be configured to transmit the image content to an outside recipient device such as the control system 100, the server 300 or directly to the UE 10.

Obviously, the control system 100 terminal may comprise other features and elements than those shown in the drawing or described herein, such as a power supply, a casing, a user interface, one or more sensors, etc., but such are left out for the sake of simplicity.

Figure 4:
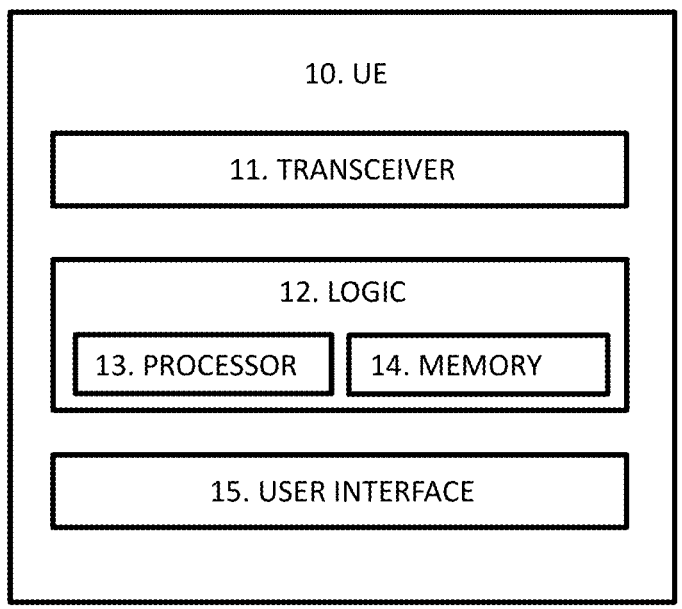
FIG. 4 schematically illustrates a user device for use in the system for recording image content of a moving user according to various embodiments.

FIG. 4 schematically illustrates functional elements of the UE 10 for use in the system 1 as outlined herein. FIG. 3 schematically illustrates an embodiment of the UE 1 for use in a wireless network 100 as presented herein, and for carrying out the method steps as outlined. The UE 1 may be any electronic device configured for wireless communication according to at least one protocol, such as a cellular 3GPP protocol, e.g.

LTE or 5G NR. Additionally or alternatively the UE 10 may be configured to communicate by e.g. wi-fi, Bluetooth or other wireless communication protocol that may be standardized or proprietary. For this purpose, the UE 10 comprises a radio transceiver 11 for communicating directly or indirectly with other entities of the system 1, such as the control system 100. The transceiver 11 may thus include a radio receiver and transmitter for communicating through at least an air interface.

The UE 1 further comprises logic 12 configured to communicate data, via the radio transceiver, on a radio channel, over a wireless communication network (not shown) and/or directly with other entities.

The logic 12 may include a processing device 13, including one or multiple processors, microprocessors, data processors, co-processors, and/or some other type of component that interprets and/or executes instructions and/or data. Processing device 13 may be implemented as hardware (e.g., a microprocessor, etc.) or a combination of hardware and software (e.g., a system-on-chip (SoC), an application-specific integrated circuit (ASIC), etc.). The processing device 13 may be configured to perform one or multiple operations based on an operating system and/or various applications or programs.

The logic 12 may further include memory storage 14, which may include one or multiple memories and/or one or multiple other types of storage mediums. For example, memory storage 14 may include a random access memory (RAM), a dynamic random access memory (DRAM), a cache, a read only memory (ROM), a programmable read only memory (PROM), flash memory, and/or some other type of memory. Memory storage 14 may include a hard disk (e.g., a magnetic disk, an optical disk, a magneto-optic disk, a solid state disk, etc.).

The memory storage 14 is configured for holding computer program code, which may be executed by the processing device 13, wherein the logic 11 is configured to control the UE 10 to carry out any of the method steps as provided herein. Software defined by said computer program code may include an application or a program that provides a function and/or a process. The software may include device firmware, an operating system (OS), or a variety of applications that may execute in the logic 11.

The UE 10 may further comprise a user interface 15, which may include a display for presentation of image content. The user interface 15 is further configured to obtain user input. For this purpose, the user interface 15 may comprise one or more of buttons, a surface sensitive to touch or proximity, e.g. a touch screen, a microphone for audio input, and an inertial measurement unit sensitive to physical movement.

Obviously, the terminal may include other features and elements than those shown in the drawing or described herein, such as a power supply, a camera, an antenna, a casing, a user interface, one or more sensors, etc., but are left out for the sake of simplicity.

Figure 5:
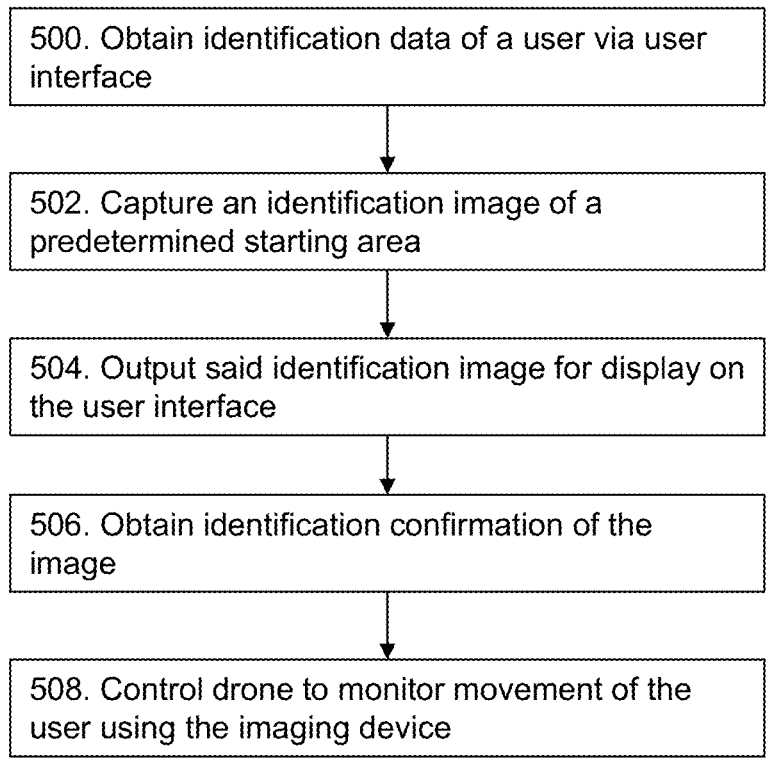
FIG. 5 schematically illustrates a flow chart of a method carried out in a system according to various embodiments.

FIG. 5 shows a flow chart of a general solution, of which various embodiments will be described in more detail below. The flow chart shows various steps carried out in a system 1 for recording image content of a moving user, the system 1 comprising a control system 100;
  a drone 200 carrying an imaging device 201;
  a user interface 15 for communication with the control system 100;
    wherein the control system 100 is configured to:
    obtain 500 identification data of a user via the user interface 15;
    capture 502 an identification image of a predetermined starting area;
    output 504 said identification image for display on the user interface 15;
    obtain 506 identification confirmation of the image; and
    control 508 the drone, responsive to the obtained confirmation, to monitor movement of the user using the imaging device.

Various embodiments falling within the scope of the general solution will now be described by way of examples.

The proposed solution will in various embodiments provide a system 1 which offers a technical configuration usable for capturing and sharing image data as a service to users. The system may be employed at a certain location or facility, such as a ski resort, a mountain bike park, a surf park, or a holiday resort, to provide an operator of the facility an opportunity to offer drone photography or filming to its customers or visitors. One challenge that the system proposed herein offers a solution to in various embodiments is the ambition to make the service partly or fully autonomous. Such autonomy is obtained where it is possible to run the system 1 without any personnel on site and there is no physical pilot that controls the drone 200. One challenge related to this set-up is to secure that the person that orders the drone filming, e.g. via a web application on the user's own UE 10, is also the person that the drone 200 actually follows and films.

FIG. 6 illustrates an embodiment set out at a ski facility, which should be understood as a non-limiting example of the general solution. Moreover, various detailed solutions presented with reference to FIG. 6 may be employed also at other types of facilities and use cases. The process is described in method steps exemplified in FIGS. 6A to 6G. The overall objective is to capture image data, such as a video sequence, using the drone 200, and subsequently share the image content with the user 60.

The system and method as described is based on the drone 200 being controlled to use object tracking to follow the user 60. The logic operated to carry out object detection may reside in the control function 120 of the control system 100 or in the control function 220 of the drone. Alternatively, the logic may be distributed.

In various embodiments, the drone 200 is configured to use a pre-set route 61 defined by one or more waypoints 62 that the drone 200 is configured to follow. While following the route 61, image content of the user 60 is captured. The image content is subsequently shared, or offered to be shared, to the user 60.

Figure 6A:
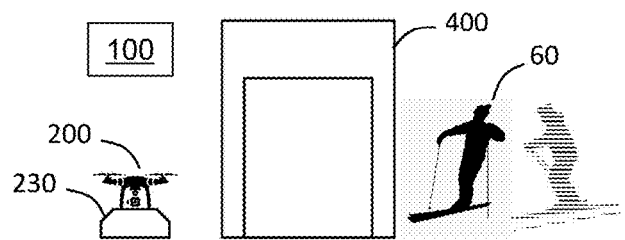
FIGS. 6A through 6G schematically illustrate various steps of the method of operating the system in one example.

FIG. 6A shows a predetermined starting area 400, at which the route may start or associated with a first way point 62. The location of the starting area 400 is predefined in the system 1. In some embodiments, the starting area 400 is also where the user 60 activates the imaging service.

Activation of the service may include user 60 entering a web application associated with the service. This may in various embodiments be carried out by entering a web address, or via scanning of a QR code using a camera of the user's 60 UE 10. The QR code may be provided at the starting area 400. This provides one way of ensuring onsite registration of the user 60 at said starting area 400. In one embodiment, the user 60 uses his/her personal smartphone or other type of UE 10 to order the service. In an alternative embodiment, the user interface is provided as part of the system 1, e.g. a portable tablet or an input screen fixed at the starting area, such as fixed to a wall or gate provided at the starting area 400. In some embodiments, activation further includes input of identification data of the user 60. The identification data may comprise an electronic address, such as an email address or a phone number, associated with the user 60 or with the UE 10. Alternatively, the identification data may be another type of data to which an electronic address is directly associated, such as a membership number, a social security number, or other. The electronic address is where our system 1 will subsequently send the captured content, or a link to the captured content, of the activity that is filmed by the drone 200. It is beneficial for the system 1 to securely match a user's 60 electronic address with the flight session of imaging the same user 60. According to the solutions provided herein, this objective is obtained by the system 1 being configured to ensure that the user 60 ordering the imaging session is the same user 60 that is identified at the starting area 400. The flow of the identification and start process is described in the consecutive drawings of FIG. 6. In various embodiments, the registration or activation step may further involve input of characteristic features of the user 60, as further outlined below.

Figure 6B:
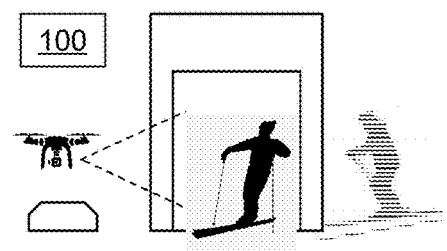

In FIG. 6B the user 60 has entered the starting area 400. The starting area may be a start gate at which an identification image of the user 60 is captured. The identification image may be captured by a camera fixed at the starting area. Alternatively, as illustrated in FIG. 6B, the drone 200 is automatically controlled to take off from a panel 230 responsive to proper activation of the service. Activation may be deemed, by the control system 100, to be obtained when the control system 100 has obtained identification of an electronic address of a user and/or receipt of payment for the imaging service, and/or possibly by receiving a launch signal from the user 60. This launch signal may be provided through the web app via the user interface 15 of the user's UE 10 or via the mentioned QR code. The drone 200 is autonomously controlled to capture an image of the starting area 400, where the user 60 is present. In some embodiments, the starting area comprises a backdrop or large screen where ideally only one person shall be present at the time. In some embodiments, the starting area may comprise a gated section, configured to house one person. This may e.g. be accomplished by tourniquets. In various embodiments, to ensure that only one person is present at the starting position 400, written instructions or visual cues may be provided at the starting area 400. The starting area is in some embodiments configured such that the screen will cover any people behind the user 60, and the screen may further be provided with visual indicators identifying the area at which the imaging device will capture the identification image. In some embodiments the visual indicators are designed to provide the system 1 with an indication of the approximate height of the user 60 based on the captured identification image, e.g. horizontal lines on the screen behind the user 60. In some embodiments, the control function 220 of the drone 200 is configured to process image data received from the imaging device 201, e.g. to measure the distance to the user 60 during the route 61.

Figure 6C:
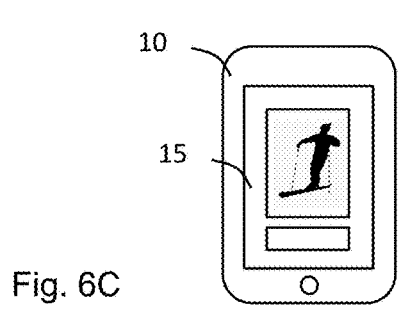

FIG. 6C illustrates the user interface 15 on the UE 10, wherein the captured identification image is output for display on the user interface. As noted, a user interface configured at the starting area 400 may instead be used in various embodiments. The identification image is used by the system 1 for object detection to identify image characteristics of the user 60. This may include size, shape, color of cloths, posture, worn equipment or any other user characteristics that may be determined based on the identification image. The system 100 is thus configured to process the captured identification image to identify one or more of such user-specific image data. In some embodiments, user activation or registration may additionally or alternatively involve input of characteristic features via the user interface, usable for identification. This may for example be accomplished by input of text data and/or by selection of selectable features displayed on the user interface 15, showing different features such as hat, jacket/shirt, glasses, equipment etc., and possibly selection of color for the respective feature. In some embodiments, this information may be prerecorded by the user 60 and tied to the identification data of the user 60, such as in a stored user profile.

The user 60 is prompted, by the control system 100, to provide identification confirmation of the output image. In some embodiments this may be obtained by touch interaction on the display of the user interface 15. In other embodiments, the control system 100 may provide video data of the user on the display of the user interface, and prompt the user to perform a gesture, such as waving of a hand, to confirm that the user 60 sees hi- or herself on the user interface 15. By means of the confirmation, the system 1 is set to control the drone 200 to use object detection and characterization using the imaging device 201, based on the identification image, to control the imaging device 201 on the drone 200 to capture image data of the user 60 based on the user-specific image data and thereby to monitor movement of the user 60.

Figure 7:
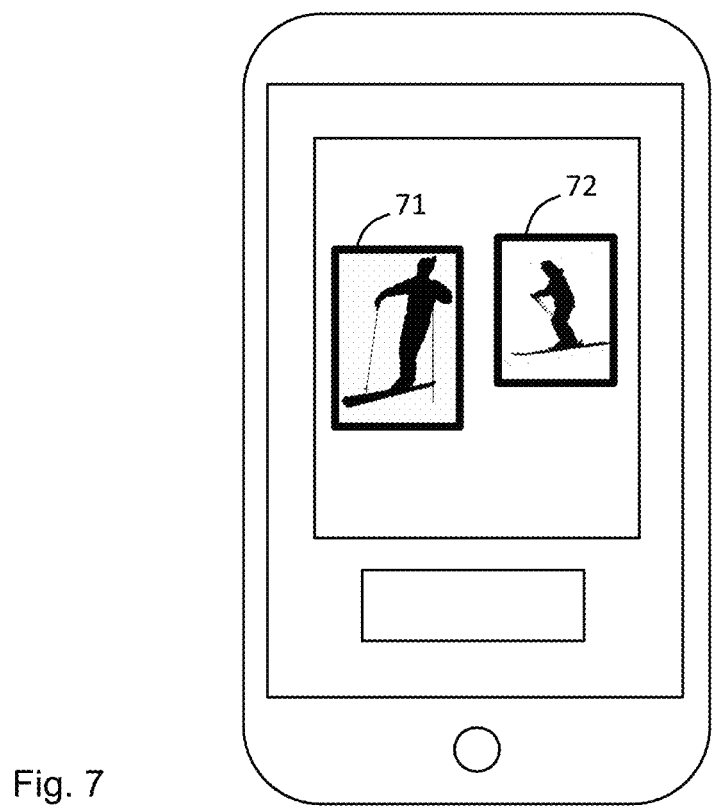
FIG. 7 schematically illustrates an example of identification confirmation according to various embodiments.

Turning now to FIG. 7, it may be that more than one person is detected in the captured image. In such a case, visual indicators 71, 72 may be provided associated with each detected person on the user interface 15 by the control system 100. The reason may be that the starting area 400 is not provided with any arrangement to ensure that only one person is visible to the imaging device capturing the identification image, or that any such arrangement has nevertheless been ignored. The user 60 will then be prompted to identify which of the persons captured on the image is the user 60, e.g. by input on the user interface 15.

Figure 6D:

As illustrated in FIG. 6D, once the identification image is captured and confirmation has been provided on the user interface 15 on the UE 10, the user 60 may stove away the UE 10 and get ready to initiate movement, such as running down a ski slope.

Figure 6E:
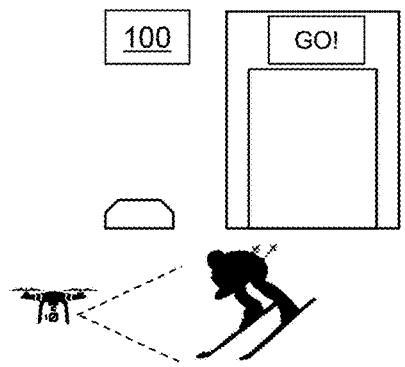

As illustrated in FIG. 6E, the user 60 may in various embodiments be prompted to start. Alternatively, the drone 200 will be ready to follow and monitor the user 60 as soon as the user 60 take away.

Figure 6F:
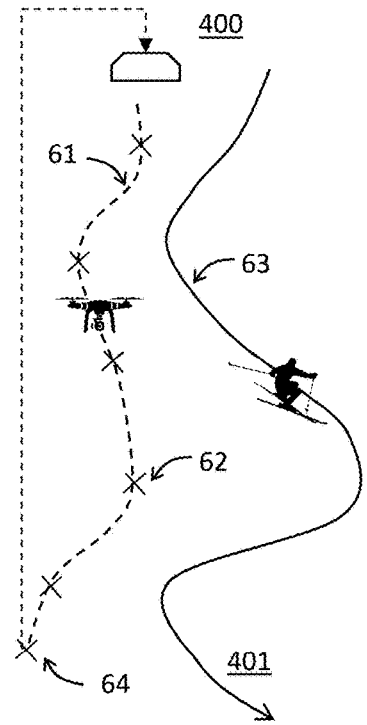
Figure 6G:
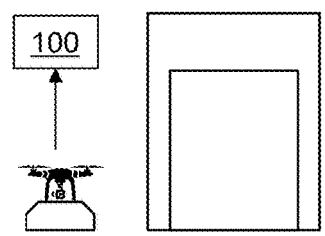

FIG. 6F illustrates the imaging sequence by the drone 200. In some embodiments, the sequence is determined by time, such as a predetermined time period from start to finish of the imaging sequence. In an alternative embodiment, the imaging sequence is determined by the predetermined route 61 that the drone 200 is configured to follow. In such an embodiment, the drone 200 may be configured, by its control function 220, to terminate imaging of the user 60 after the user 60 or the drone 200 passes a certain location. In the example of FIG. 6F, a ski slope is covered from the starting area 400 to a finish area 401, such as a slalom course or a fun park. The drone is preconfigured to follow the route 61 by passing through a number of waypoints 62.

Furthermore, in various embodiments the control function 220 of the drone 200 is configured to steer the imaging device to be directed towards the user 60 during the imaging sequence, based on the user-specific image data. This provides a beneficial effect since the predetermined route 61 does not necessarily align with the path 63 taken by the user 60.

In some embodiments, although the drone is configured to autonomously follow the predetermined route 61, the control function 220 of the drone is configured to control the speed of the drone 200 based on the monitored movement of the user. The position of the user 60 as determined by the imaging device 201 is used as input for the speed control of the drone 200. The speed may be controlled to substantially be the same as the speed of the user 60. Alternatively, the drone 200 may be preconfigured to capture images at different angles to the user at different parts of the route 61, such as from the side, the back or the front. This may be preset in the control function 220 of the drone 200, dependent on the character of area through which the user 60 runs, such as different jumps of a fun park.

By means of the autonomous control of the drone 200 passage through the route 61, no pilot is required to operate the drone 200. Moreover, the route 61 may be preconfigured such that the drone 200 will capture images from distances and angles with respect to the user route 63 at a controlled safe distance. The speed of the user 60 moving thus defines the speed of the drone 200 and where the imaging device 201 is pointing. This is all controlled by using object tracking algorithms and by analyzing the video stream from the imaging device 201. Technology for image processing and object tracking are as such known, and are thus not described in detail herein.

When the imaging sequence is over, determined based on the user 60 a finish area 401 or the drone reaching a final waypoint 63, the drone 200 returns to the starting area 400. The drone 200 further uploads the captured image content from its image data memory 203 to the control system 100. This may be carried out by wireless transmission, either while the drone 200 is returning or after landing at the panel 230.

In some embodiments the control system 100 may be configured to process the captured image content, such as by performing image stabilization post processing, light and color enhancement or stabilization, or by adding sound or further image content, e.g. to promote the facility at which the image content was captured.

The control system 100 is further configured to transmit access information to image data captured by the drone 200, to said electronic address or to an account or user profile associated with the identification data. The access information may e.g. be a link to the image content on a server 300, to which server 300 the control system 100 uploads the image content obtained from the drone 200, with or without further processing. Alternatively, the control system 100 may transmit the image content directly to the UE 10 by wireless transfer.

Various embodiments have been outlined above, and except where they are clearly contradictory, they may be combined in any form.

What is claimed is:

1. A system for recording image content of a moving user, the system comprising
a control system;
a drone carrying an imaging device;
a user interface for communication with the control system;
wherein the control system is configured to:
obtain identification data of a user via the user interface;
automatically control the drone to take off in response to obtaining the identification data;
capture an identification image of a predetermined starting area associated with a predetermined route of the drone;
output said identification image for display on the user interface;
obtain, from the user, identification confirmation of the image; and
control the drone, responsive to the obtained confirmation, to monitor movement of the user using the imaging device.

2. The system of claim 1, wherein the control system is configured to:
capture the identification image using the imaging device of the drone.

3. The system of claim 1, wherein the control system is configured to:
process the captured identification image to identify user-specific image data;
control the imaging device to capture image data of the user based on the user-specific image data.

4. The system of claim 1, wherein logic is configured to control movement of the drone autonomously along the predetermined route.

5. The system of claim 4, wherein said route is defined by a plurality of predetermined waypoints.

6. The system of claim 1, wherein logic is configured to control speed of the drone based on the monitored movement of the user.

7. The system claim 1, wherein said identification data comprises an electronic address of the user.

8. The system of claim 7, wherein the control system is configured to:
transmit, to said electronic address, access information to image data captured by the drone while monitoring movement of the user.

9. The system of claim 1, wherein the control system is configured to capture the identification image responsive to said identification data comprising an electronic address.

10. The system of claim 1, wherein the control system is configured to:
output said user interface on a user device responsive to onsite registration of the user device at said predetermined area.

11. The system of claim 1, comprising
a gated section configured to house one person, at said predetermined area.

12. The system of claim 1, wherein the drone is an unmanned aerial vehicle.

13. A method for recording image content of a moving user, comprising
obtaining identification data via a user interface;
automatically controlling a drone to take off based on obtaining the identification data;
capturing an identification image of a predetermined starting area associated with a predetermined route of the drone;
outputting said image for display on the user interface;
obtaining, from the user, identification confirmation of the image; and
controlling the drone to monitor movement of the user using the imaging device.

14. The method of claim 13, comprising:
capturing the identification image using the imaging device of the drone.

15. The method of claim 13, comprising:
processing the captured identification image to identify user-specific image data;
controlling the imaging device to capture image data of the user based on the user-specific image data.

16. The method of claim 13, comprising:
controlling movement of the drone autonomously along the predetermined route, which is defined by a plurality of predetermined waypoints; and
controlling speed of the drone based on the monitored movement of the user.

17. The method of claim 13, wherein said identification data comprises an electronic address of the user.

18. The method of claim 17, comprising:
outputting said user interface on a user device responsive to onsite registration of the user device at said predetermined area.

19. The method of claim 13, wherein the identification image is captured responsive to said identification data comprising an electronic address, the method further comprising:
transmitting, to said electronic address, access information to image data captured by the drone while monitoring movement of the user.

* * * * *